(12) United States Patent
Meijer et al.

(10) Patent No.: US 12,223,344 B2
(45) Date of Patent: Feb. 11, 2025

(54) MANAGING FAIRNESS IN TASK BUNDLING OF A QUEUE

(71) Applicant: COMCAST CABLE COMMUNICATIONS MANAGEMENT, LLC, Philadelphia, PA (US)

(72) Inventors: Paul Meijer, Seattle, WA (US); Brian Burkhart, Seattle, WA (US); Chris Orogvany, Seattle, WA (US)

(73) Assignee: Comcast Cable Communications Management, LLC, Philadelphia, PA (US)

( * ) Notice: Subject to any disclaimer, the term of this patent is extended or adjusted under 35 U.S.C. 154(b) by 0 days.

(21) Appl. No.: 14/069,911

(22) Filed: Nov. 1, 2013

(65) Prior Publication Data
US 2015/0128149 A1   May 7, 2015

(51) Int. Cl.
*G06F 9/48* (2006.01)
(52) U.S. Cl.
CPC .................. *G06F 9/4843* (2013.01)
(58) Field of Classification Search
None
See application file for complete search history.

(56) References Cited

U.S. PATENT DOCUMENTS

| | | | | |
|---|---|---|---|---|
| 6,263,359 B1 * | 7/2001 | Fong | ..................... | G06F 9/4881 718/100 |
| 2008/0281792 A1 * | 11/2008 | Pickett | ................ | G06F 16/1794 |
| 2010/0037226 A1 * | 2/2010 | Benhase | ............. | G06F 12/0866 718/102 |
| 2011/0307895 A1 * | 12/2011 | Liao | ....................... | G06F 9/5027 718/102 |
| 2013/0262556 A1 * | 10/2013 | Xu | ........................ | G06F 9/5027 709/202 |

FOREIGN PATENT DOCUMENTS

WO  WO-2008133821 A1  11/2008

OTHER PUBLICATIONS

Xiao, J., et al., An Application-Level Scheduling with Task Bundling Approach for Many-Task Computing in Heterogeneous Environments, Lecture Notes in Computer Science vol. 7513, 2012, pp. 1-13.
Zhao, Han, Hypergraph-based task-bundle scheduling towards efficiency and fairness in heterogeneous distributed systems, Parallel & Distributed Processing (IPDPS), 2010 IEEE International Symposium, 2010 (12 pages).

* cited by examiner

*Primary Examiner* — Lewis A Bullock, Jr.
*Assistant Examiner* — Melissa A Headly
(74) *Attorney, Agent, or Firm* — Ballard Spahr LLP

(57) ABSTRACT

Methods and systems for managing a queue are disclosed. In one aspect, an example method can comprise accessing at least a portion of a queue comprising a plurality of tasks. Each task of the plurality of tasks can be associated with a property, and the property associated with each task can comprise a respective value. An exclusion value can be determined based on a distribution of the respective values. A group of tasks that comprises respective values of the property that do not match the exclusion value can be selected from the queue, and the selected group of tasks can be processed.

20 Claims, 11 Drawing Sheets

Method for determining task priority

↓

Identify originators of tasks in queue
605

↓

Prioritize tasks such that a task is processed from each originator before turning to the next task from a given originator
610

↓

325

MANAGING FAIRNESS IN TASK BUNDLING OF A QUEUE

BACKGROUND

In any system in which multiple users demand attention from a limited resource, the system must be capable of handling scenarios in which the users simultaneously ask for more than the system can deliver. One way of dealing with potential log jams in such a system is to implement queues that cause each requested transaction to be handled in turn. First-in first-out (FIFO) and first-in last-out (FILO) are common queue implementations, in which transactions are handled either in the order in which they are received (FIFO) or from most newest to oldest (FILO). Although these queue implementations have the effect of handling transactions in turn, they do not have the ability to examine the details of the transaction being requested to more efficiently handle a queue, or to take transactions out of the normal queue order in a systematic fashion that improves the performance of the system.

SUMMARY

It is to be understood that both the following general description and the following detailed description are exemplary and explanatory only and are not restrictive, as claimed. Provided are methods and systems for managing a queue.

In one aspect, an example method can comprise accessing at least a portion of a queue comprising a plurality of tasks. Each task of the plurality of tasks can be associated with a property, and the property associated with each task can comprise a respective value (e.g., for each task). An exclusion value can be determined based on a distribution of the respective values. For example, the exclusion value can be a value that occurs within the portion of the queue a number of times that exceeds a fairness threshold. A group of tasks that comprises respective values of the property that do not match the exclusion value can be selected from the queue, and the selected group of tasks can be processed.

In another aspect, an example method can comprise selecting a first group of tasks from a queue and selecting a second group of tasks from the queue according to a constraint. The constraint can distribute (e.g., or specify distribution of) processing opportunities across the first group of tasks and the second group of tasks based on a time-agnostic property (e.g., a property unrelated to time) of the tasks in the queue. The second groups of tasks can be processed.

In another aspect, an example method can comprise accessing a queue comprising a plurality of tasks. Each task of the plurality of tasks can be associated with a property, and the property associated with each task can comprise a respective value for each task. A determination can be made on whether a value frequency threshold has been exceeded in at least a portion of the queue. A group of tasks not associated with a value that exceeds the value frequency threshold can be selected from the queue, and the selected group of tasks can be processed.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 6 is a flow chart illustrating another example of a method for determining task priority within the queue in accordance with the methods and systems described herein;

DETAILED DESCRIPTION

Figure 1:
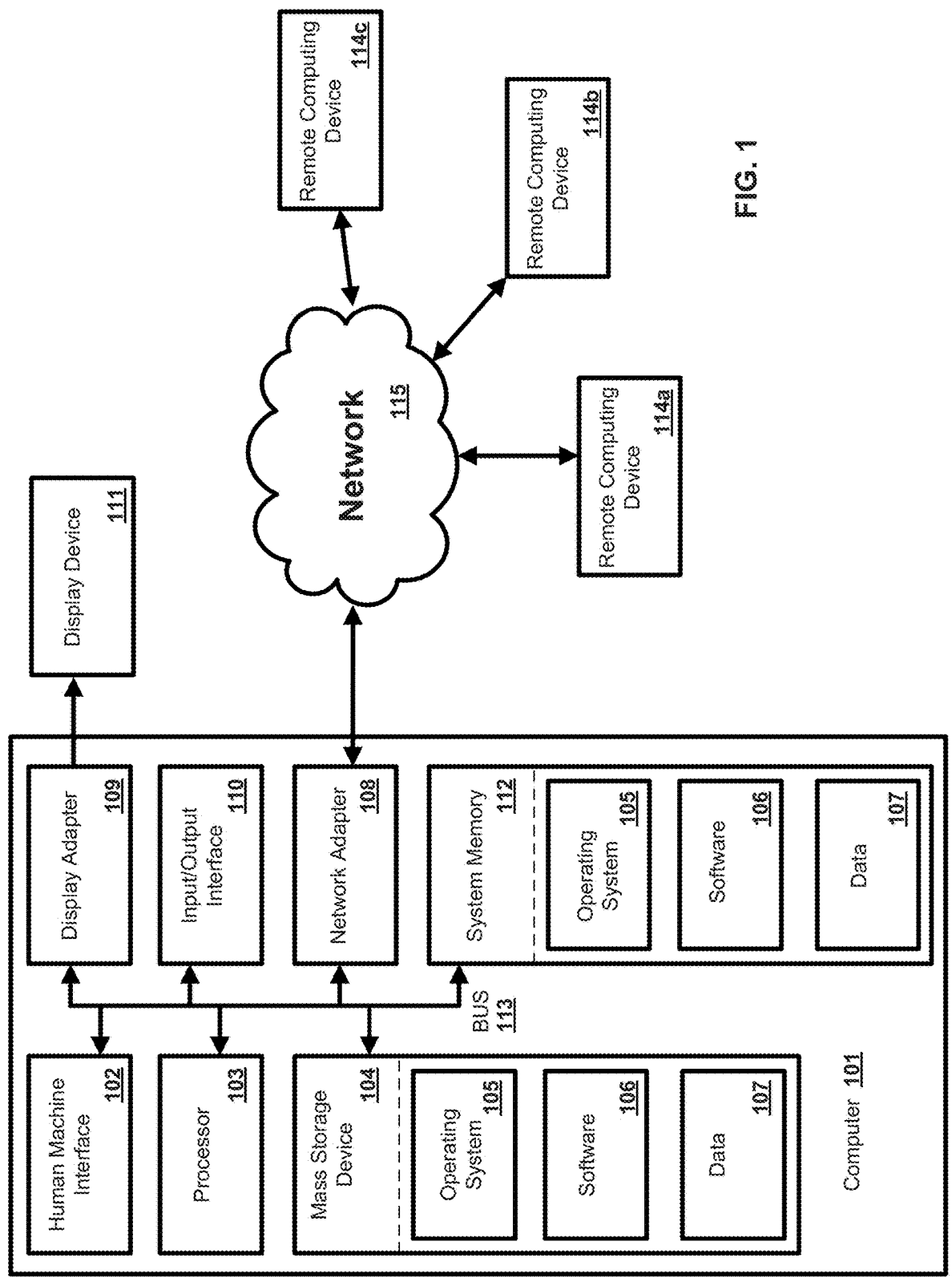
FIG. 1 is a block diagram illustrating an example of a system in which the methods and systems described herein can operate.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the distribution points of each of the ranges are significant both in relation to the other distribution point, and independently of the other distribution point.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present disclosure relates to processing of queues. For example, an example system can process a variety of tasks requested by users (e.g., tenants, customers) of the system. The tasks can involve information, media, information related to media, user information, account information, content delivery information, and the like. In one aspect, the tasks in the queue can be processed individually or in groups by agents or services. The agents or services can be associated with specific task types and be configured to perform processing of groups of task in parallel. The selection of groups of tasks can be done according to variety of prioritization and fairness principles. For example, an exclusion value can be identified from one group of selected tasks. Tasks associated with the exclusion value can be omitted or excluded from another group of selected tasks. Additionally, a value frequency threshold can be used to exclude tasks from certain groups of selected tasks. For example, if the number of tasks associated with a value exceed a value frequency threshold from a first group of tasks, then tasks having this value can be excluded from a second group of selected tasks. Such techniques can allow uneven distribution of processing resources within selected group of tasks while still allowing minimum levels of access to processing across multiple groups.

FIG. 1 illustrates various aspects of an exemplary system in which the present methods and systems can operate. The present disclosure relates to a method for processing tasks, and in one embodiment, a multi-tenant system. Those skilled in the art will appreciate that present methods may be used in systems that employ both digital and analog equipment. One skilled in the art will appreciate that provided herein is a functional description and that the respective functions can be performed by software, hardware, or a combination of software and hardware.

In an exemplary aspect, the methods and systems can be implemented on a computer 101 as illustrated in FIG. 1 and described below. The methods and systems disclosed can utilize one or more computers to perform one or more functions in one or more locations. FIG. 1 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 101. The components of the computer 101 can comprise, but are not limited to, one or more processors or processing units 103, a system memory 112, and a system bus 113 that couples various system components including the processor 103 to the system memory 112. In the case of multiple processing units 103, the system can utilize parallel computing.

The system bus 113 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 113, and all buses specified in this description can also be implemented over a wired or wireless network connection and each of the subsystems, including the processor 103, a mass storage device 104, an operating system 105, software 106, data 107, a network adapter 108, system memory 112, an Input/Output Interface 110, a display adapter 109, a display device 111, and a human machine interface 102, can be contained within one or more remote computing devices 114a,b,c at physically separate locations, connected through buses of this form, in effect implementing a fully distributed system.

The computer 101 typically comprises a variety of computer readable media. Exemplary readable media can be any available media that is accessible by the computer 101 and comprises, for example and not meant to be limiting, both volatile and non-volatile media, removable and non-removable media. The system memory 112 comprises computer readable media in the form of volatile memory, such as random access memory (RAM), and/or non-volatile memory, such as read only memory (ROM). The system memory 112 may contain data such as media, video, audio, or other data 107 and/or program modules such as operating system 105 and software 106 capable of manipulating, translating, transcoding, or otherwise editing the data 107 that are immediately accessible to and/or are presently operated on by the processing unit 103.

In another aspect, the computer 101 can also comprise other removable/non-removable, volatile/non-volatile computer storage media. By way of example, FIG. 1 illustrates a mass storage device 104 which can provide non-volatile storage of computer code, computer readable instructions, data structures, program modules, and other data for the computer 101. For example and not meant to be limiting, a mass storage device 104 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 104, including by way of example, an operating system 105 and media manipulation software 106. Each of the operating system 105 and media manipulation software 106 (or some combination thereof) can comprise elements of the programming and the media manipulation software 106. Media, video, audio, or other data 107 can also be stored on the mass storage device 104. Media, video, audio, or other data 107 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 101 via an input device (not shown). Examples of such input devices comprise, but are not limited to, a keyboard, pointing device (e.g., a "mouse"), a microphone, a joystick, a scanner, tactile input devices such as gloves, and other body coverings, and the like. These and other input devices can be connected to the processing unit 103 via a human machine interface 102 that is coupled to the system bus 113, but can be connected by other interface and bus structures, such as a parallel port, game port, an IEEE 1394 Port (also known as a Firewire port), a serial port, or a universal serial bus (USB).

In yet another aspect, a display device 111 can also be connected to the system bus 113 via an interface, such as a display adapter 109. It is contemplated that the computer 101 can have more than one display adapter 109 and the computer 101 can have more than one display device 111. For example, a display device can be a monitor, an LCD (Liquid Crystal Display), or a projector. In addition to the display device 111, other output peripheral devices can comprise components such as speakers (not shown) and a printer (not shown) which can be connected to the computer 101 via Input/Output Interface 110. Any step and/or result of the methods can be output in any form to an output device. Such output can be any form of visual representation, including, but not limited to, textual, graphical, animation, audio, tactile, and the like. The display 111 and computer 101 can be part of one device, or separate devices.

The computer 101 can operate in a networked environment using logical connections to one or more remote computing devices 114a,b,c. By way of example, a remote computing device can be a personal computer, portable computer, smartphone, a server, a router, a network computer, a peer device or other common network node, and so on. Logical connections between the computer 101 and a remote computing device 114a,b,c can be made via a network 115, such as a local area network (LAN) and/or a general wide area network (WAN). Such network connections can be through a network adapter 108. A network adapter 108 can be implemented in both wired and wireless environments. Such networking environments are conventional and commonplace in dwellings, offices, enterprise-wide computer networks, intranets, and the Internet.

For purposes of illustration, application programs and other executable program components such as the operating system 105 are illustrated herein as discrete blocks, although it is recognized that such programs and components reside at various times in different storage components of the computing device 101, and are executed by the data processor(s) of the computer. An implementation of media manipulation software 106 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

Figure 2:
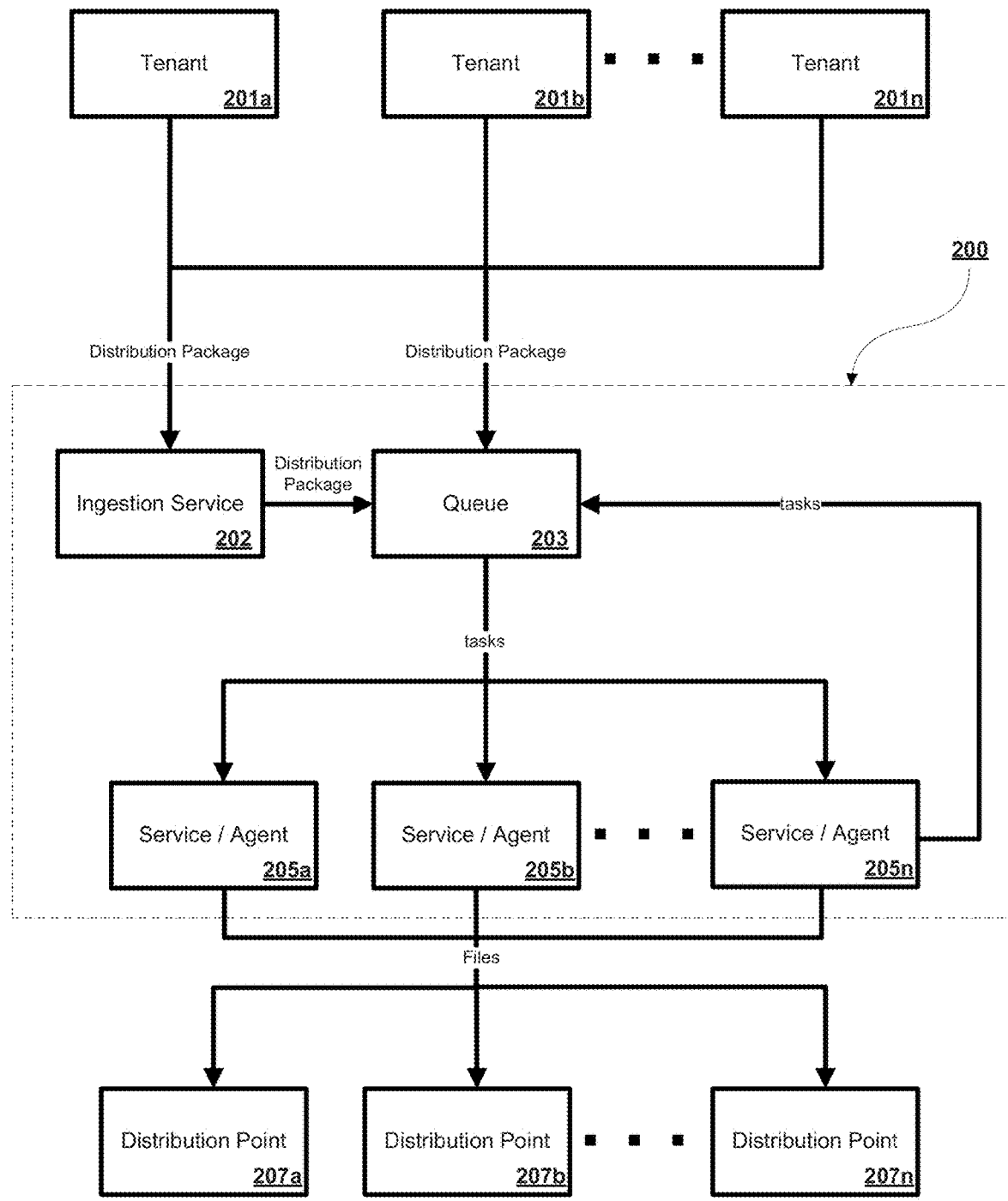
FIG. 2 is a block diagram illustrating an example of an embodiment of a queuing system in accordance with the methods and systems described herein.

Turning now to FIG. 2, a block diagram illustrating an exemplary embodiment of a queuing system 200 in accordance with the methods and systems described herein is shown. The exemplary embodiment of FIG. 2 illustrates a multi-tenant environment in which multiple tenants 201$a,b,n$ access a system 200 that includes one or more services/agents 205$a,b,n$, where n signifies the nth tenant or service/agent respectively. In the exemplary embodiment, the system 200 receives requests to perform tasks from one or more tenants 201$a,b,n$, queues the tasks in the queue 203, and then distributes (e.g., individually or as groups) the tasks to at least one service/agent 205$a,b,n$ for processing. In an exemplary embodiment, the system 200 is used to perform various processing and/or distribution of media created by the tenants 201$a,b,n$.

For example, a tenant 201$a,b,n$ may generate one or more media distribution packages, that can comprise content such as, but not limited to, audio and/or video files. The system 200 can be configured to use a service/agent 205,$a,b,n$ to process the media distribution packages for various services. The system 200 can be configured to distribute the distribution packages to various services. As one non-limiting example, the tenant 201$a,b,n$ may create a media distribution package that includes a movie, and may seek to distribute the media distribution package to multiple distribution points 207$a,b,n$ at which a consumer may view the movie. By way of example, the distribution points 207$a,b,n$ can comprise video streaming services configured to stream the movie to a television, computer, set top box, smartphone, tablet computer, or other device capable of receiving the stream. The distribution points 207$a,b,n$ can also comprise video or other data downloading services that allow a media distribution package to be downloaded to a television, computer, set top box, smartphone, tablet computer, or other device capable of receiving the distribution package. The distribution point can also comprise media distribution internet sites that allow software such as web browsers or other applications to access the website to play the distribution package through such website.

Frequently, in this example, a tenant 201$a,b,n$ may want the video to end up at more than one such distribution point 207$a,b,n$. In conventional systems, this presents a problem in that each distribution point may have different requirements for the way files it receives must be formatted and processed. By way of example, some distribution points 207$a,b,n$ may require video to be formatted in a Motion Picture Experts Group format, such as .mpeg, .mp3, .mp4, or other file formats, while other distribution points 207$a,b,n$ may require video to be formatted in accordance with streaming technologies, such as Adobe Flash, Microsoft Silverlight, or other streaming formats. Distribution points 207$a,b,n$ may also use the same or similar file formats, but may require different (e.g., or multiple) frame rates, resolutions, or file sizes. As another example, different distribution points 207$a,b,n$ can also comprise different advertisement policies, or can comprise restrictions on geographical regions that can access the media. The formats, frame rates, compression schemes, streaming technologies, policies, restrictions, and distribution mechanisms available for audio and video are continuously changing as video compression and distribution technology changes.

Further complicating the problem is that some distribution points 207$a,b,n$ may require that the files the distribution point receives have protection that prevents or deters unauthorized copying and distribution of the distribution package. For example, Digital Rights Management (DRM) such as, but not limited to, the Content Scrambling System (CSS), Protected Media Path (PMP), Advanced Access Content System (AACS), and Marlin systems may need to be associated with the file. The problem is further complicated because providing the distribution package to certain distribution points 207$a,b,n$ may not be as simple as transmitting a file. Certain distribution points 207$a,b,n$ may perform further processing outside of the control of the system 200, and such processing can take an extended period of time, and can also fail or otherwise terminate unexpectedly. In some systems, success or failure of a distribution operation can only be identified by checking back with the system to check the status of the operation.

To distribute the media distribution package in the example above to multiple distribution points 207$a,b,n$, the media distribution package may have to be processed multiple times in multiple different ways to accomplish the desired distribution. The exemplary system 200, on the other hand, provides multiple services/agents 205,$a,b,n$ that can perform the necessary operations. The exemplary system 200 can also perform the necessary operations for multiple tenants 201$a,b,n$, and/or on multiple media distribution packages, whether the media distribution packages are received from one or multiple tenants 201$a,b,n$. The queuing system disclosed herein includes methods and systems that can effectively handle multiple process steps (e.g., as individual tasks or groups of tasks) for multiple distribution packages submitted for handling by multiple tenants 201a,b,n. As one of skill in the art would recognize, however, the queuing system is not limited to a multi-tenant environment. For example, the system can also be used in single tenant environments to effectively handle processing for multiple distribution packages, or for single distribution packages that may benefit from, or be subject to, multiple processing steps. Although the exemplary embodiments described herein relate to the processing of media distribution packages, the system 200 can be used for queuing of any type of files, and is not limited to media processing.

Turning back to FIG. 2, in an exemplary embodiment, a tenant 201a,b,n is a user of the system. Each tenant 201a,b,n can be a computing device or network of computers such as the computer 101 described in FIG. 1. Each tenant 201a,b,n can be a computer configured to create, edit, and/or store media, such as video and audio. Each tenant 201a,b,n can also be an account that provides access to the system 200 to a user, such as a subscriber to the system, a media publisher or distributor, or other person or company that may use the system 200. The illustration of FIG. 2 includes three tenants 201a,b,n. However, as one of skill in the art would understand, the present disclosure is applicable to systems having as few as one tenant, and the maximum number of tenants 201a,b,n is limited only by available bandwidth and resources in a given implementation, and the systems and methods disclosed here have no limit on the number of potential tenants 201a,b,n.

Each tenant 201a,b,n can submit one or more distribution packages to the system for processing. In an exemplary embodiment, the distribution packages contain content, such as movies, television programs, other video or audio. In an alternative exemplary embodiment, the distribution packages can contain any type of file which the tenant 201a,b,n wishes the system to process, such as, for example, word processing files, spreadsheet files, and image files. Distribution packages can also comprise information about the distribution package, such as, for example, the title, author, description, storage location, format, size, duration, or destination. A distribution package can also contain instructions or tasks that are to be performed as part of the file processing. In yet another alternative exemplary embodiment, the distribution packages can include URLs, access restriction policies, and advertisement policies. One of skill in the art would understand that each of these types of files can be stored in a number of different formats, and all such formats are within the scope of the present disclosure.

In an exemplary embodiment, the tenant 201a,b,n can submit the distribution package to the system 200 by way of an ingestion service 202. The exemplary ingestion service 202 can be one or more computing devices or networks of computers configured to act as a repository for distribution packages that are to be processed by the system 200. By way of example, the ingestion service 202 can be configured to receive a distribution package and create tasks based on the information therein. In an exemplary embodiment, the ingestion service 202 processes everything but the follow-up actions, which it adds to a queue 203 for further processing. In an alternative exemplary embodiment, the ingestion service 202 can be configured to add all tasks to be processed to a queue 203 for further processing. As one of skill in the art would recognize, the precise division of processing between the ingestion service 202 and processing that is queued for later processing is an implementation detail that can vary from system to system.

The ingestion service 202 can be configured to take in the distribution package from a tenant 201a,b,n as part of a "pull" operation in which the ingestion service 202, from time to time, communicates with a tenant 201a,b,n and initiates a transfer of distribution packages from the tenant 201a,b,n to the ingestion service 202. The ingestion service 202 can pull media from the tenant 201a,b,n periodically, or can do so in response to a notification that the tenant 201a,b,n has distribution packages ready to be transferred into the system. The ingestion service 202 can also take in the distribution package as part of a "push" operation wherein the tenant 201a,b,n transmits distribution packages for processing to the ingestion service 202. In an alternative exemplary embodiment, distribution packages need not pass through an ingestion service 202. Rather, distribution packages that enter the system can be transmitted directly into a queue 203 for handling.

In an exemplary embodiment, a distribution package can be associated with tasks or instructions that will identify the types of processing that the distribution package is to undergo. By way of example, if the distribution package is a movie that is to be distributed to a website streaming service and to the video-on-demand (VOD) service of a video service provider, the tasks associated with the distribution package can include two publish tasks. The first publish task can prepare the distribution package for the streaming service by, for example, performing the appropriate conversions for that service and providing the converted file (or files) to the streaming service. The first publish task can also comprise tasks such as checking on the status of the transmission of the file to the streaming service, and whether or not the file was successfully added to the streaming service. In this example, the second publish task can prepare the distribution package for the provider's VOD service by performing the appropriate conversions for that service and transmitting the file to the cable company for distribution within its system. In this example, the publish task can appear to be a high level command to the tenant, such as "publish," and the system would determine the appropriate steps for publication to the chosen service. In an alternative example, the publish command can be a collection of more detailed commands, such as 1) convert the distribution package to a given file type, 2) apply certain post processing, and 3) transmit the resulting file to a given destination. Once the tasks applicable to a given distribution package are established, the tasks are placed on a queue 203 and processed. The tasks can be selected and processed individually or as groups.

The tasks are then placed on a queue 203 for processing. In an exemplary embodiment, the queue 203 is a list of tasks that the system will handle. In an alternative exemplary embodiment, the queue 203 is a database, wherein each entry of the database is a task. In an exemplary embodiment, the list of tasks is stored within a single computer or network of computers that has knowledge of all tasks in the queue 203. In alternative exemplary embodiments, however, the system 200 can comprise multiple queues. In the multiple-queue embodiment, the tasks can be divided into queues in a wide variety of ways depending on the particular application. By way of example only, related tasks, such as those waiting for a particular agent 205,a,b,n or a particular distribution package, can be grouped together. Alternatively, the multiple-queue embodiment can divide tasks so as to balance the load on the system so that each queue 203 is roughly equivalent in size or backlog.

The tasks can comprise (e.g., or be associated with) information that allows them to be handled in an efficient manner. In an exemplary embodiment, in which the distribution package to be processed is a media distribution package, the task can comprise (e.g., or be associated with) the following information.

| Task Information Field | Description |
| --- | --- |
| DateAdded | Date and time the task was added to the queue |
| OwnerID | Identity of the tenant that added the task |
| MediaID | The media file to be processed |
| Method | The type of operation to perform on the media file |
| Ready | Is the media file ready to be processed |
| AgentName | The agent that is currently using the media file |
| ScheduledTime | The time at which the action should be processed |

In an exemplary embodiment, the task information is stored in a file associated with the distribution package, for example, an extensible markup language (XML) file, spreadsheet, database, or text file. In alternative embodiments, the task information can be embedded in the file itself such that the task information can be read from the file. As one of skill in the art would understand, the fields described in the exemplary embodiment are simply examples of the types of fields that can be used to prioritize tasks in a queue 203 and the fields listed above are neither exclusive exhaustive, but rather, are intended only to illustrate the operations associated with the queue 203.

As tasks in the queue 203 are processed, they are handled by one or more services or agents 205,a,b,n that are capable of performing the requested task. In an exemplary embodiment, each agent 205,a,b,n can comprise a program or set of programs configured to carry out a particular task. By way of example only, the system 200 can comprise an agent 205,a,b,n for each type of conversion that the system 200 can perform. The system 200 can comprise an agent 205,a, b,n for each type of distribution point 207a,b,n to which a distribution package is to ultimately be published. The system 200 can comprise agents 205,a,b,n configured to carry out various tasks within the system 200. For example, an agent 205,a,b,n can be configured to send email or other messages in response to the occurrence of certain tasks. An agent 205,a,b,n can also be configured to check a service to determine the status of a publication operation carried out by another agent 205,a,b,n. An agent 205,a,b,n can also be configured to share a file with other tenants 201a,b,n. In an alternative exemplary embodiment, each agent 205,a,b,n can be configured to provide multiple functions. The particular tasks described above are intended to be exemplary, and are not exhaustive. One of skill in the art would understand that software programs capable of performing these tasks, including tasks for the conversion and processing of media files, are well known.

An agent 205,a,b,n can be a program, for example, an application, designed to perform a specific task running in a process or thread on a given computer or network of computers along with a number of other agents 205,a,b,n. Alternatively, an agent 205,a,b,n can be a special purpose computer or network of computers that is dedicated to performing a single task or a small number of tasks. In one aspect, an agent 205,a,b,n can be configured to receive and process individual tasks and/or to receive and process groups of tasks at the same time. For example, an agent 205,a,b,n can comprise multiple processors and/or processor cores configured to process tasks in parallel. An agent 205,a,b,n can request individual tasks from the queue and/or request groups of tasks from the queue. For example, an agent 205,a,b,n can select the individual tasks or groups of tasks from the queue. As another example, the queuing system 200 can select individual tasks or groups of task from the queue in response to a request for tasks from an agent 205,a,b,n.

In some implementations an agent 205,a,b,n can preselect a portion of the queue and select tasks or groups of tasks from the pre-selected portion of the queue. In some implementations the pre-selected portion and/or any selected group of tasks of the queue can be selected by excluding one or more values from the queue. For example, an exclusion value or a value exceeding a value frequency threshold can be excluded from the pre-selected portion of the queue. For example, an exclusion value can be a value associated with a task (e.g., via a property or information field of the task) previously selected and processed. For example, the exclusion value can be a value of a task in a previous group of selected tasks. The exclusion value can be any (e.g., or all) of the values in the previous group, the highest occurring value in the previous group, the second highest occurring value in the previous group, and/or the like. The value frequency threshold can be a number of times a value occurs in a given portion of the queue and/or a selected group of tasks from the queue. Selection of the groups of tasks and/or a preselected portion of the queue can be performed according to a variety of prioritization principles, such as those described in FIGS. 4-8. For example, the group of tasks can be selected according to an even number, odd number, prime number, or any other relevant number of tasks or characteristic of the tasks.

One task that can be performed by an agent 205,a,b,n can be the task of delivering a file that has been processed by the system 200 to one or more distribution points 207a,b,n. In an exemplary embodiment where the distribution package includes a video file, a distribution point 207a,b,n can be a user-facing media outlet. A distribution point 207a,b,n can also be a gateway provided for content providers to deliver content to a user-facing media outlet, such as, for example, an internet address, file transfer protocol (FTP) server, or cloud storage. A user-facing media outlet can be, for example, a video service provider, a video streaming service, an audio streaming service, a media downloading service, or any other service that allows access to media. In an alternative exemplary embodiment, the distribution point 207a,b,n may not be user-facing, but may simply be storage for the file, such as in an archive or backup, or another system that allows for later retrieval.

In an exemplary embodiment, delivering a file to a distribution point can include transmitting the file to the distribution point 207a,b,n or otherwise placing the file in a storage location where the distribution point can obtain the file. In an alternative exemplary embodiment, transmitting a file to the distribution point 207a,b,n can involve multiple steps, including transmitting the file, and then checking back at a later time to determine whether the file has been successfully loaded onto the distribution point 207a,b,n. In this alternative embodiment, the agent 205,a,b,n can further check back with the distribution point 207a,b,n to acquire status of the file transfer, and determine whether the transfer of the file was successful. The agent 205,a,b,n can also create additional tasks and place them back on the queue 203 that will invoke an agent 205,a,b,n sometime in the future that will communicate with the distribution point to determine the status of the transfer of the file.

Figure 3:
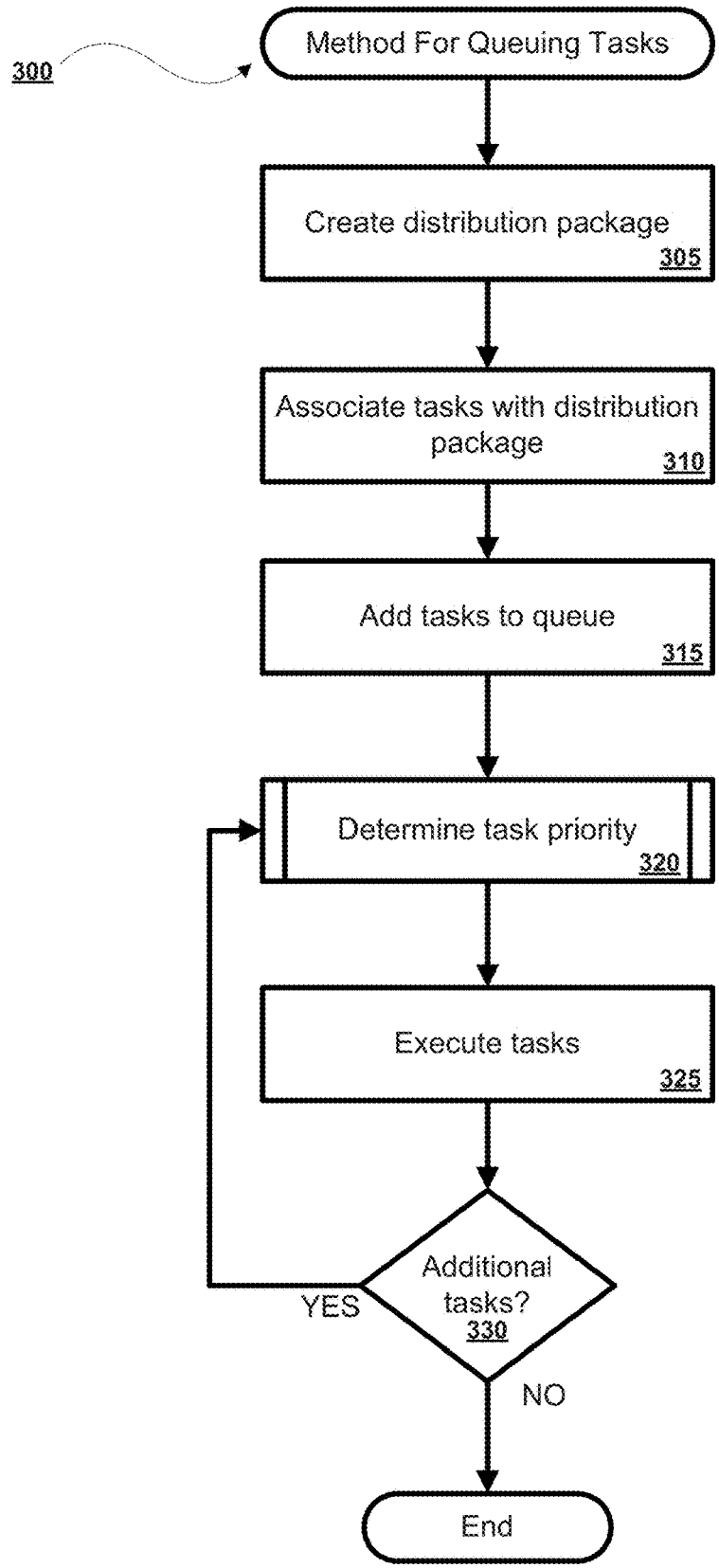
FIG. 3 is a flow chart illustrating an example of a method of queuing tasks in accordance with the methods and systems described herein.

FIG. 3 is a flow chart illustrating an exemplary method 300 of queuing actions in accordance with the present disclosure. FIG. 3 will be discussed with reference to FIG. 1 and FIG. 2. Beginning with step 305, a distribution package can be created that is to be processed by the system. In an exemplary embodiment, the distribution package can be created by a tenant. In an alternative exemplary embodiment, the distribution package can be created by another system, computer, network of computers, or other entity, and stored in or transmitted to a tenant. The method then proceeds to step 310.

In step 310, tasks are associated with the distribution package. In an exemplary embodiment, a task is a process, action, or other event that will be performed in as the system processes the distribution package. In an exemplary embodiment, the task can include, but is not limited to, a publish task, a conversion task, a distribution task, a communication task, a billing task, an ingestion task, or an indexing task. In an alternative embodiment, a task can take place within a given system, and is not limited to tasks relating to the processing of media files.

By way of example, a publish task can specify a destination for the distribution package, such as a distribution point 207a,b,n. Such a publish task may also describe any processing that would take place on that distribution package to prepare it for its destination. Alternatively, the system can store, based on the identity of the destination for the distribution package, any processing that would be applied to the distribution package prior to delivery of the file to the destination. A conversion task can convert or transcodes a file associated with a distribution package from one format to another, such as, for example, by encoding, decoding, upconverting, downconverting, splicing, or performing other processing that would be known to one of skill in the art. For example, a conversion can occur from audio video interleave (AVI) format to MPEG-2 or MPEG-4. The conversion task can also include parameters relating to the output, such as, but not limited to, the frame rate, scale, size, audio level, and video quality. The conversion task can also convert a file into the same destination format, for example, MPEG-2 to MPEG-2, where the conversion does not change the file format, but may change other parameters associated with the file.

A distribution task can direct a file to its destination distribution point. By way of example, the distribution point 207a,b,n can be a repository in which the file is to be placed, the distribution task can include an address for the repository. For example, the address can be an internet FTP address, the internet protocol (IP) address of a server, or the path to network or local storage. The distribution task may also include log-on information, such as a user ID and password, if the destination requires authentication for access. The distribution task may also include security tokens or keys as necessary to negotiate a connection with the distribution point.

In an exemplary embodiment, a distribution task can also include additional sub-tasks relate to distribution. By way of example, the distribution task can include a status-update task that checks the distribution point 207a,b,n for the status of the transmission. If the transmission is not complete, the status-update task can continue to run, or can create another status-update task that will run at a later time.

A communication task can provide a notification, status update, or other information relating to the system's processing. The process of distribution package processing can potentially take an extended period of time, and can involve multiple steps, some of which, such as the distribution task, can fail. The systems and methods disclosed herein can use a communication task to notify other actors in the system, such as a tenant, or actors outside the system, such as any party that might be interested in the progress of distribution package processing. By way of example, a communication task can send an email, text message, short message service (SMS) message, multimedia messaging service (MMS) message, telephone call, or page. The communication task can also post update information to a public or private messaging or social media services where it can be reviewed by anyone who has access thereto.

An indexing task can comprise indexing information related to a variety of objects. For example, objects can comprise Programs, TV Listings, Category, Tenants, Media, usage rights, and/or the like. In one aspect, the indexing task can index metadata associated with an object. Additionally, the indexing task can prepare the index for usage in search functionality that allows tenants to search the indexed information.

An ingestion task can comprise ingesting (e.g., recording, storing, receiving) a live stream and preparing the live stream for a video on demand system. For example, the ingestion task can comprise recording the large stream and associating the recording with program data.

Although the tasks have been described separately, the tasks can be combined, nested within one another, or further separated to provide more detailed control over the system processing. For example, the publish task can comprise a convert task and a distribution task (or the equivalent functionality) by default. In this way, the tenant 201a,b,n can simply specify that the file is to be published to a particular distribution point. The systems and methods can then create the appropriate convert and distribution tasks for that distribution point. Alternatively, the tenant 201a,b,n can create separate convert and distribution tasks that achieve a similar result, but provide the tenant 201a,b,n with additional control. In this way, the task handling allows for a flexible platform that can both hide details from the tenants 201a,b,n and allow for simplicity of operation, or expose details to tenants 201a,b,n and allow for greater control.

The method then proceeds to step 315, wherein the tasks are added to a queue 203. The method then proceeds to step 320 wherein the priority for the tasks in the queue 203 are determined and a priority is associated with each task. There are a number of considerations that can be used to determine task priority. For example, task priority can be determined based on the order in which the tasks were added to the queue 203. Such an approach may not result in the most efficient handling of tasks, however, and it may also allow certain tenants 201a,b,n or certain distribution packages to appropriate an undue share of system resources at the expense of other tenants 201a,b,n and distribution packages. For this reason, the systems and methods disclosed herein can consider additional factors in setting the priority of tasks. By way of example, the systems and methods disclosed here consider a time after which a task is available to a system, the availability of the system or agents 205,a,b,n in the system that are configured to process tasks of the type, whether each tenant 201a,b,n on the system has had an opportunity to have its tasks processed, priority that prevents other tasks from operating on the object until the task is complete, and whether certain preconditions for processing a task have occurred. The step 320 of determining task priority will be discussed in further detail with respect to FIGS. 4-7.

The method then proceeds to step 325, wherein the tasks are executed according to their priority. In one aspect, step 325 can comprise providing an individual task to an agent. In another aspect, step 325 can comprise providing a group of tasks together to an agent. The agent can process the tasks from the group of tasks in parallel. The method then proceeds to decision step 330, wherein it is determined if additional tasks are to be processed. Additional tasks can be spawned by tasks currently executing, for example, a communication task that checks status of a distribution. Additional tasks can also be added to the queue 203 by tenants 201a,b,n. If additional tasks are to be processed, the YES branch is followed to step 320 wherein task priority is determined. When returning to step 320, in an exemplary embodiment, the system can reprioritize all tasks in the queue 203 in view of the new task. In an alternative embodiment, the system can reprioritize the new task separately from any tasks that have already been prioritized. Turning again to decision step 330, if it is determined that there are no additional tasks to process, the NO branch is followed and the method ends.

Figure 4:
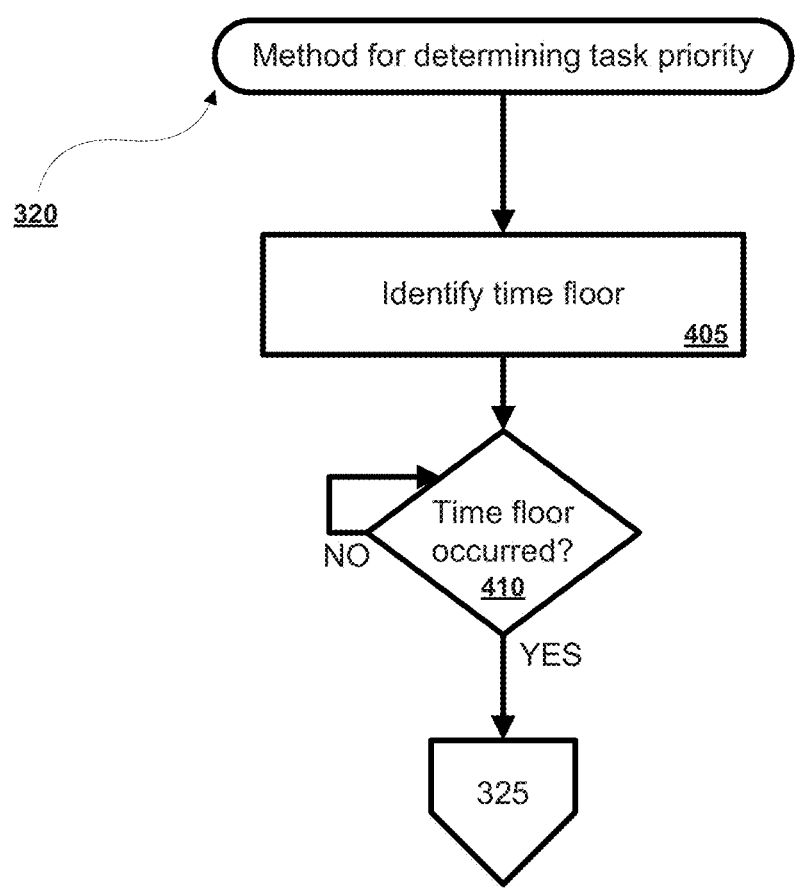
FIG. 4 is a flow chart illustrating an example of a method for determining task priority within the queue in accordance with the methods and systems described herein.

Turning now to FIG. 4, a first method for determining task priority 320 is described. FIG. 4 is a method wherein priority of a task is determined, at least in part, by a time before which the task should not be processed. Beginning with step 405, a time floor for the task is identified. By way of example, the time floor is expressed as a time and date. For uniformity purposes, the time can be a universal time, such as Greenwich Mean Time (GMT). The time and date can be stored in a file associated with the task, such as an XML file or a database, or it can be stored in the task itself. The method then proceeds to decision step 410, wherein it is determined if the time floor has occurred. If the time floor has not occurred, the NO branch is followed and the method returns back to decision step 410. If the time floor has occurred, the YES branch is followed and the method returns to step 325 of FIG. 3, wherein the task is selected individually or as part of a group of tasks for processing and execution.

Figure 5:
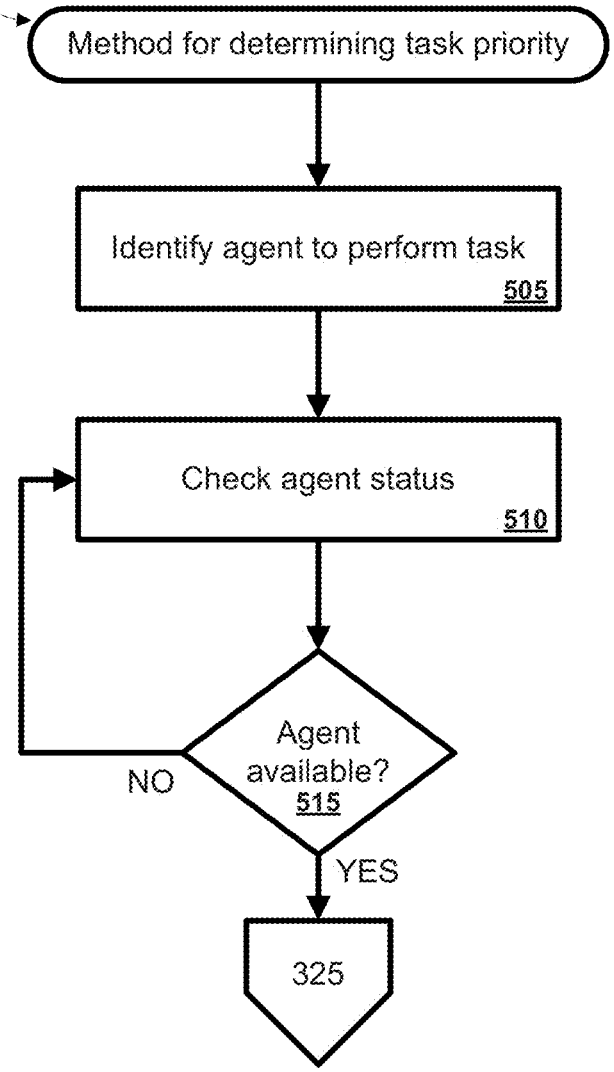
FIG. 5 is a flow chart illustrating another example of a method for determining task priority within the queue in accordance with the methods and systems described herein.

Turning now to FIG. 5, another method for determining task priority 320 is described. FIG. 5 is a method wherein priority of an task is determined, at least in part, by the availability of an agent 205,a,b,n to perform one or more tasks associated with the task. Beginning with step 505, an agent 205,a,b,n is identified that can perform one or more tasks associated with the task. The method then proceeds to step 510, wherein it is determined if the agent 205,a,b,n is available to process the task. By way of example, if one of the tasks to be performed is the conversion of a video file from one format to another, checking the availability of an agent 205,a,b,n to perform the task can involve requesting the status of the system or process that performs conversion tasks. The system or process can then report whether it is busy, not available, or available. The method then proceeds to decision step 515, wherein it is determined whether the agent 205,a,b,n is available. If the agent 205,a,b,n is not available, the NO branch is followed to step 510. If the agent 205,a,b,n is available, the YES branch is followed to step 325 of FIG. 3, and the task is selected individually or as part of a group of tasks for processing and execution.

Turning now to FIG. 6, another method for determining task priority 320 is described. FIG. 6 is a method wherein priority of the task is determined, at least in part, to establish fairness among the tenants 201a,b,n of the system. Beginning with step 605, the originators or requestors of the tasks in the queue 203 are determined. In an exemplary embodiment, the originators can be identified by the contents of the OwnerID field associated with the task. The method then proceeds to step 610, wherein the tasks can be prioritized such that a task is processed from each originator before turning to the next task from a given originator. By way of example, a system according to this disclosure can comprise four tenants A, B, C, and D. For the purposes of this example, tenant A has submitted 3 tasks, B has submitted 2 tasks, C has submitted 1 task, and D has submitted 5 tasks. In step 610, the method would process one task from tenant A, one from tenant B, one from tenant C, and one from tenant D. After processing, A will have 2 tasks remaining, B will have 1 task remaining, C will have no tasks remaining, and D will have 4 tasks remaining. In the exemplary embodiment, the process continues in this manner until all tasks from A, B, C, and D have been processed.

As another example, A has 50 tasks and B, C, and D each have 10 tasks. In this example, the tasks can be processed in groups, such as a first group of tasks and a second group of tasks. For example, a first group of tasks can be selected and processed. The first group of tasks can comprise 10 tasks from tenant A. The system can analyze the first group and recognize the number of the tasks in the first group associated with tenant A. If this number is above a threshold (e.g. according to a fairness constraint or otherwise), then the system can be configured to select tasks for a second group of tasks (e.g., the next group after the first group) according to one or more fairness constraints or other criteria. For example, the system can prioritize selection of tasks that are associated with tenants other than tenant A. As a further example, the system can first select a task from each of tenants B, C, and D as tasks for the second group of tasks. If the system allows additional selection of tasks in the second group of tasks, then the system can select additional tasks for the second group according to additional constraints or criteria. For example, the remaining tasks for the second group can be selected from the tasks associated with tenant A. As another example, the remaining tasks can be selected from tenants B, C, and D. The method then returns to step 325 and provides the selected tasks individually or as groups to one or more agents for processing and execution. For example, the agent can request individual tasks and/or groups of tasks from a queuing system, and the queuing system can comply with the request from the agent. Though such methods of prioritization are described with respect to specific tenants, it should be appreciated that such principles of selection can be applied to any of the properties (e.g., information fields) of the tasks.

Figure 7:
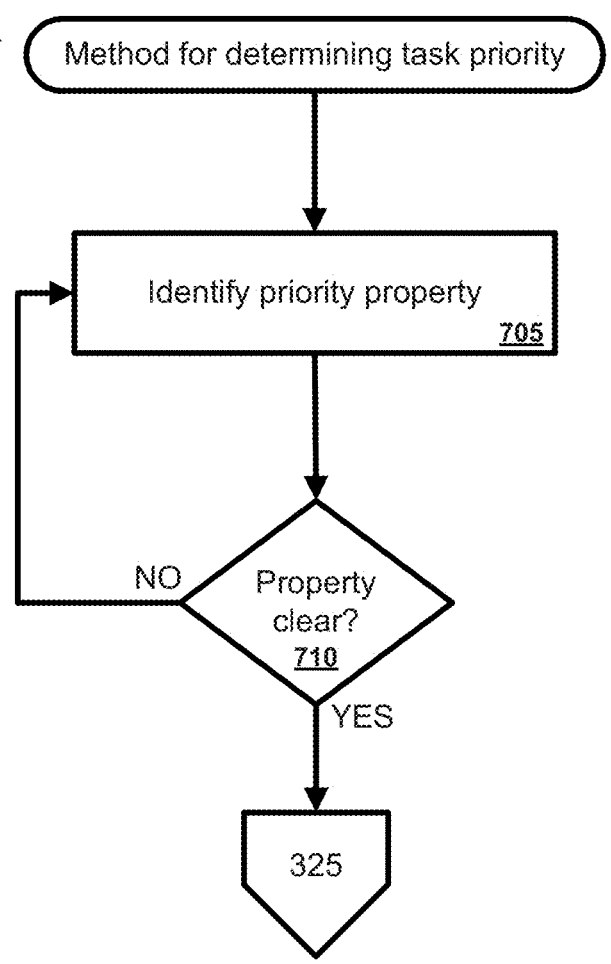
FIG. 7 is a flow chart illustrating another example of a method for determining task priority within the queue in accordance with the methods and systems described herein.

Turning now to FIG. 7, another method for determining task priority 320 is described. FIG. 7 is a method wherein task priority is determined such that one task will follow another based on a property of that task. Beginning with step 705, the task property is identified. By way of example, the task property can be the mediaID of media associated with the task. In this example, if there are multiple publish or convert tasks associated with the given mediaID, it may not be appropriate to execute these tasks simultaneously, because simultaneous processing can corrupt the file, or otherwise hinder processing. In this example, then, the second task that is operating on media with the given mediaID will remain on the queue 203 until the first task has completed processing.

In an alternative exemplary embodiment, the property of the task can be the completion status of another task that will complete processing before the task can be executed. By way of example, a task property can be a Ready field, that, by way of example only, can be a Boolean value that, by default, is set to true. An task property can also be an identifier of another task, for example, a TaskDependency field. In an exemplary embodiment, in step 705 the tasks in the queue 203 can be scanned for tasks that will operate on media having the same mediaID. If multiple tasks are identified that will operate on the same mediaID, then the tasks can be sequenced, for example, according to the other priority methods described above with respect to FIGS. 4-6. Then, all such tasks in the queue 203, except for the first task to be processed, can have their Ready field set to FALSE, and have their TaskDependency field set to the ID of the task that is being processed. Once the task has been processed, the method can scan the task queue 203 for the next task that was dependent on the processing of that task, and set its Ready flag to TRUE. A task can have multiple dependencies that must be met before the Ready flag is set to TRUE, and therefore may have multiple TaskDependency fields to allow for such processing. As one of skill in the art would understand, the use of flags and dependency fields is merely an example of one way tasks can be sequenced, and other methods, such as, but not limited to assigning specific sequencing information, can also be used.

The method then proceeds to decision step 710, wherein it is determined whether the property is clear. In the first example above, the property is clear once no agents 205,a,b,n are operating on media with the given mediaID. In the second example above, if the Ready flag is set to TRUE, the property is clear. If the property is not clear, the NO branch is followed to step 705. If the preconditions are met, then the YES branch is followed and the method returns to step 325 of FIG. 3 and the tasks are executed.

Although several methods of prioritizing tasks have been described individually herein, they are not mutually exclusive and can be executed together. By way of example only, tasks can first be prioritized for fairness, and then further prioritized based on agent 205,a,b,n availability and satisfaction of preconditions. As one of skill in the art would understand, the methods for determining task priority can be used together in any combination, and they can also be used alone.

Figure 8:
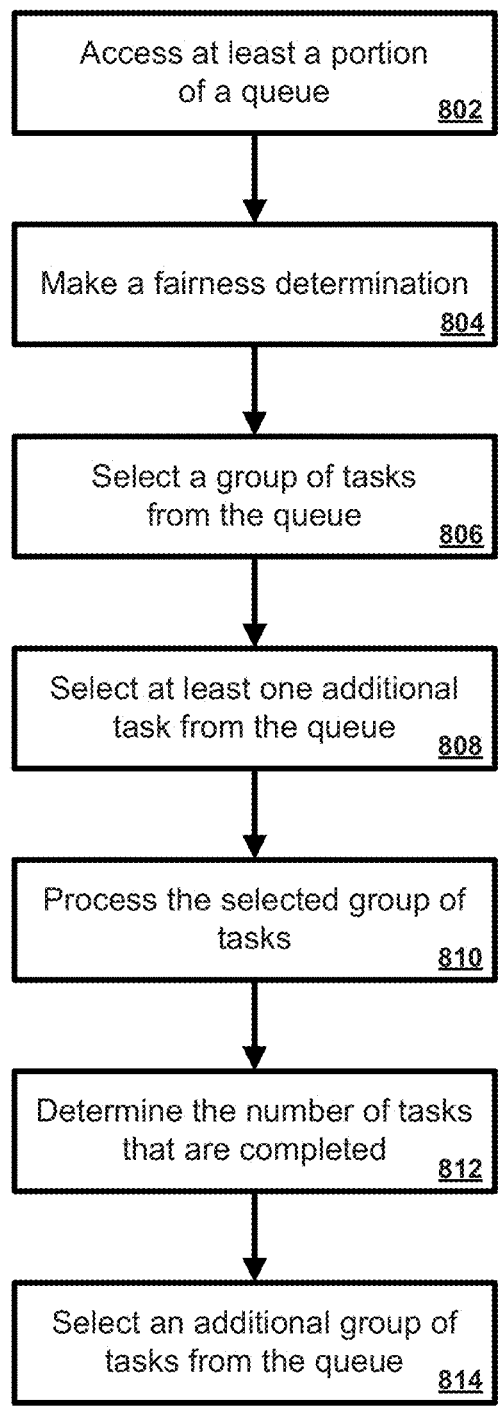
FIG. 8 is a flow chart illustrating a method for managing a queue.
Figure 9:
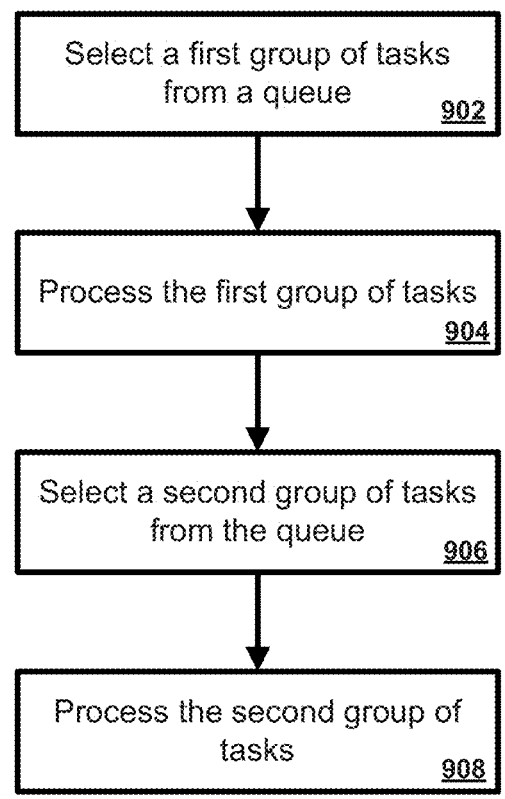
FIG. 9 is a flow chart illustrating another method for managing a queue.
Figure 10:
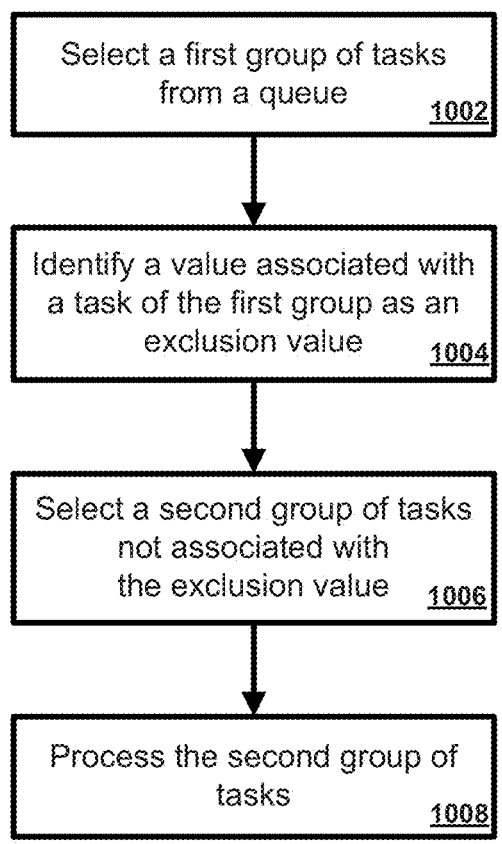
FIG. 10 is a flow chart illustrating another method for managing a queue.

FIGS. 8-10 are flow charts illustrating example methods for managing a queue. In one aspect, any of the aspects described above can be utilized with respect to the methods described below. FIGS. 8-10 elaborate on embodiments of the present disclosure that contemplate processing a queue by selecting and processing bundles or groups of tasks from the queue. Selecting groups of tasks can provide higher efficiency in processing the queue. To compensate for approaches that use bundling, a variety of fairness criteria and/or constraints can be applied to ensure that tenants of an example system do not suffer from resource starvation, such as when a queuing system fails to provide a minimum amount of processing resources to a specified category of tasks. The present disclosure contemplates an approach to task processing fairness that allows uneven distribution of processing resources within a task group while providing for minimum levels of access to processing resources across multiple groups of tasks.

FIG. 8 is a flow chart illustrating a method 800 for managing a queue. At step 802, at least a portion of a queue can be accessed. For example, a specified portion of the queue can be accessed. In one aspect, the queue (e.g., or the portion thereof) can comprise a plurality of tasks. Each task of the plurality of tasks can be associated with a property. In one aspect, the property associated with each task can comprise a respective value. For example, tasks can be received from a variety of locations and parties. The at least a portion of the queue that is accessed can comprise tasks in chronological order or tasks according to other constraints. For example, tasks with certain property values can be excluded or included in the at least a portion of the queue.

Tasks can be associated with a variety of information indicating the requestor of the task, media objects associated with the task, type of task, agents assigned to the task, and other relevant information. As an example, a task can be associated with information fields (e.g., in a database or otherwise) such as DateAdded, OwnerID, MediaID, Method, Ready, AgentName, ScheduledTime fields described herein. As an example, the property can be an information field, such as one of the information fields described herein. The property can comprise a variety of values associated with the information field. As an illustration, an example property, the OwnerID, can comprise example values respective to each task, such as tenant A, tenant B, tenant C, and so forth or other customer identifier used to indicate a tenant of a queuing system.

At step 804, a fairness determination can be made. For example, an exclusion value can be determined based on a distribution of the respective values. The distribution of the values can be determined by analyzing at least a portion of the queue. For example, the values of one or more of the properties associated with the task can be accessed, analyzed, or otherwise inspected. As a further illustration, one or more of the values for a property associated with tasks in at least a portion of the queue can be counted. For example, a counter can be incremented for every task that is associated with a particular property value of a particular property. In one aspect, the exclusion value can be determined based on the results of the counter. For example, the exclusion value can be a mode of the distribution of the respective value. The mode is the value that occurs the highest number of times in the distribution. The exclusion value can be a second highest occurring value in the distribution or can be defined by some other similar frequency threshold. It should be noted, that the exclusion value can be at least one of the respective values associated with the tasks in the queue. For example, the exclusion value can comprise at least one of an association with an account, a time attribute within a time range, a task type, an association with a media object, an association with a processing agent, and/or the like values, such as a value of the information fields described herein.

In another aspect, determining the exclusion value based on a distribution of the respective values can comprise selecting at least one exclusion value if the exclusion value occurs in the at least a portion of the queue. For example, each of the values of the property in the at least a portion of the queue can be accessed and stored (e.g., or a copy of the value). One or more of these stored values can be selected as exclusion values. In some scenarios, all of the stored values from the portion of the queue can be used as exclusion values. In one aspect, the at least a portion of the queue can be a portion of the queue previously selected for processing by one or more agents.

As another example, making the fairness determination can comprise determining whether a value frequency threshold has been exceeded in at least a portion of the queue. In one aspect, the value frequency threshold can comprise a threshold value indicative of a number tasks associated with a value in the at least a portion of the queue. As an illustration, the value frequency threshold can be 1, 5, 10, 20, 25, 50, 100, 500, 1000, 1000, or any value suitable for a specific implementation. In one aspect, determining whether the value frequency threshold has been exceeded in at least a portion of the queue can comprise counting a number of tasks associated with the value in the at least a portion of the queue. In some implementations, a counter may not be used but rather identification can be made that a value is present within the at least a portion of the queue. In one aspect, the value that exceeds the frequency threshold can comprise at least one of an association with an account, a time attribute within a time range, a task type, an association with a media object, an association with a processing agent, and/or the like. For example, the value can be a value of one of the information fields described herein. As an illustration, if the portion of the queue comprises ten tasks and the frequency threshold is equivalent to seven out of ten tasks (e.g., 70 percent), then the frequency threshold can be exceeded when the portion of the queue associated with a particular value of a property reaches and/or exceeds seven tasks out of ten.

At step 806, a group of tasks can be selected from the queue. In one implementation, the at least a portion of the queue can be a first group of tasks. The first group of tasks can be selected and processed. The group of tasks selected in step 806 can be selected after the first group of tasks. For example, the first group of task can be removed from the queue and at least partially processed by an agent. Then, the same agent or another agent can perform step 806.

In one aspect, the tasks selected for the group of tasks can comprise respective values of the property that do not match the exclusion value. In another aspect, selecting from the queue the group of tasks can comprise excluding at least one task. The at least one excluded task can be associated with the value that exceeds the value frequency threshold. As another example, at least one task associated with the exclusion value can be excluded from the group of tasks. In one aspect, the group of tasks can be selected from the queue together as a bundle of tasks configured for processing by an agent.

As an illustration, selecting the group of tasks from the queue can comprise selecting tasks according to one or more first criteria. For example, the first criteria can specify that the next X number (e.g., 5, 10, 20, 100, and/or the like) of tasks be selected according to the time ordering of tasks in the queue. As another example, the first criteria can specify that the tasks be selected such that at least one task is selected for every different value (e.g., or a subset thereof) of the property. As an illustration, if there are only five different values of a property among the tasks in a queue, then the selecting can begin by selecting one task for each value of the property. If, for example, one of the values is designated as an excluded value (e.g., or value exceeding the value frequency threshold), then selecting can begin by selecting a task for each value except the excluded value (e.g., or value exceeding the value frequency threshold). In one aspect, such selection process can be repeated until all tasks (e.g., or a specified number) associated with one or more values, such as values other than the exclusion value, are selected for the group of tasks.

In one aspect, step 806 can comprise pre-selecting a portion of the queue. The pre-selected portion of the queue can be selected based on a requested number of tasks from an agent and/or service. The pre-selected portion of the queue can be larger in size than the requested number of tasks. For example, if the agent and/or service requests a group of X number of tasks, the pre-selected portion of the queue can comprise X number of tasks multiplied by a factor or otherwise increased. As an illustration, if an agent requests a group of 5 tasks, then the pre-selected portion of the queue can comprise 50 tasks. As another illustration, if the agent requests a group of 50 tasks, then the pre-selected portion of the queue can comprise 500 tasks. In one aspect, step 806 can comprise selecting the group of tasks from the pre-selected portion of the queue.

At step 808, at least one additional task can be selected from the queue for the group of tasks. In one aspect, step 808 can be performed after step 806. In one aspect, the at least one additional task can be associated with the exclusion value. In some scenarios, it can be desirable to select additional tasks for the group of tasks. These additional tasks can be selected, for example, based on the first criteria or by one or more second criteria. For example, when using the first criteria again, the remaining tasks for the group can be selected by selecting at least one more task for each available property value of a property (e.g., or in some cases, each property value except the exclusion value or the value exceeding the value frequency threshold). In another aspect, the second criteria can specify that the at least one additional tasks be associated with the exclusion value or a value that exceeds the value frequency threshold. As an illustration, the group of tasks can first be selected by selecting at least one task associated with each of the values (e.g., except the exclusion value) of the property. Then, after a fairness criteria is met (e.g., all tasks or a specified number of tasks not associated with the exclusion value or value exceeding the value frequency threshold are selected from the queue), then at least one additional task can be selected as part of the group of tasks by selecting tasks from the queue associated with the exclusion value or the value that exceeds the value frequency threshold. In one aspect, step 808 can comprise selecting the at least one additional task from the pre-selected portion of the queue.

At step 810, the selected group of tasks can be processed. For example, the group of tasks can be executed in parallel. As a further example, the selected tasks can be transmitted to and received by an agent and/or service as described herein. The agent and/or service can be associated with one or more particular values of a property, such as a task type. For example, the agent and/or service can be configured to process the particular task type. In one aspect, the agent and/or service can comprise one or more processors configured to perform one or more tasks in parallel.

At step 812, a number of the tasks of the group of tasks for which processing is completed can be determined. For example, the agent and/or service can be configured to track the processing and/or execution of tasks and determine when the tasks are completed. When a task is completed, a counter can be incremented and the counter can be compared to a threshold. In one aspect, the counter can be compared to a threshold at regular time intervals.

At step 814, an additional group of tasks can be selected from the queue based on the number of tasks of the group of tasks for which processing is completed. For example, the additional group of tasks can be selected after a threshold number of tasks have been completed. In one aspect, a number of the tasks of the group of tasks can be different than a number of the tasks of the additional group of tasks. For example, the number of tasks selected from the queue for the additional group of task can be based on the capacity or processing limit of an agent processing the tasks. As an illustration, the group of tasks selected can comprise ten tasks. After six or more tasks are completed, reaching an example threshold of six tasks, the agent can select and/or request six or more additional tasks as the additional group of tasks. In one aspect, the additional group of tasks can be selected based on exclusion values and/or values exceeding a value frequency threshold determined based on the group of tasks selected in step 806 and/or 808. For example, a value of a task of the selected group of tasks can be determined as an exclusion value and/or a value exceeding a value frequency threshold for purposes of selecting the additional group of tasks.

FIG. 9 is a flow chart illustrating another method 900 for managing a queue. At step 902, a first group of tasks can be selected from a queue. As an illustration, selecting the first group of tasks from the queue can comprise selecting tasks according to one or more first criteria (e.g., or constraints). For example, the first criteria can specify that the next X number (e.g., 5, 10, 20, 100, and/or the like) of tasks be selected according to the time ordering of tasks in the queue. As another example, the first criteria can specify that the tasks be selected such that at least one task is selected for every different value (e.g., or a subset of values) of the property. As an illustration, if there are only five different values of a property among the tasks in a queue, then the selecting can begin by selecting one task for each value (e.g. or subset of values) of the property. In one aspect, step 902 can comprise selecting the first group of tasks from a pre-selected portion of the queue.

At step 904, the first group of tasks can be processed. For example, the first group of tasks can be removed from the queue. The first group of tasks can be provided to one or more agents and/or services configured to perform, execute, or otherwise complete the tasks. In one aspect, the first group of tasks can be processed in parallel. For example, the agent and/or service can comprise and/or access one or more processors configured to process tasks in parallel. In one aspect, processing the first group of tasks can comprise accessing one or more objects and/or metadata associated with objects. Example objects can comprise Programs, TV Listings, Category, Tenants, Media, usage rights, and/or the like.

At step 906, a second group of tasks can be selected from the queue according to a constraint. In one aspect, the constraint can distribute (e.g., control, instruct, or otherwise inform distribution performed by a computing device) processing opportunities across the first group of tasks and the second group of tasks based on a time-agnostic property of the tasks in the queue. For example, the constraint can minimize (e.g., control, instruct, or otherwise inform minimization performed by a computing device) time tasks spend in the queue according to the time-agnostic property. A time-agnostic property is a property unrelated to time. For example, the time-agnostic property can comprise a value that is not indicative (e.g., at least by itself) of a particular time or time period. As an illustration, the time-agnostic property can comprise at least one of an association with an account, a task type, an association with an object, an association with a processing agent, and/or the like. In one aspect, the time-agnostic property can be an order-agnostic property. An order-agnostic property is a property that is unrelated to ordering information of the queue. For example, an order-agnostic property can be a property that is not indicative (e.g., at least by itself) of an order of the tasks in a queue.

In one aspect, the constraint can allow uneven distribution of tasks based on the time-agnostic property within at least one of the first group of tasks and the second group of tasks. For example, allowing uneven distribution based on the time-agnostic property within at least one of the first group of tasks and the second group of tasks can comprise allowing at least one of the first group of tasks and the second group of tasks to comprise a number of tasks within the respective group of tasks that exceeds a fairness threshold. The numbered tasks can each be associated with a specified property value of the time-agnostic property. As an illustration of uneven distribution, the first group of tasks can comprise only tasks (e.g., or a number of tasks above a threshold level) that are associated with a first value of a property (e.g., a first customer or tenant). In one scenario, the second group of tasks can comprise only tasks (e.g., or a number of tasks above a threshold level) that are associated with a second value of a property. In another scenario, the second group of tasks can be selected by first selecting tasks associated with one or more specific property values. For example, distributing processing opportunities across the first group of tasks and the second group of tasks based on the time-agnostic property can comprise distributing tasks associated with a first property value of the time-agnostic property to the second group of tasks before distributing tasks associated with a second property value of the time-agnostic property to the second group of tasks. Such distribution can be performed if a number of tasks associated with the second property value selected for the first group exceeds a fairness threshold. In one aspect, step 904 can comprise selecting the first group of tasks from a pre-selected portion of the queue.

At step 908, the second group of tasks can be processed. For example, the second group of tasks can be removed from the queue. The second group of tasks can be provided to one or more agents and/or services configured to perform, execute, or otherwise complete the tasks. In one aspect, the second group of tasks can be processed in parallel. For example, the agent and/or service can comprise and/or access one or more processors configured to process tasks in parallel. In one aspect, processing the second group of tasks can comprise accessing one or more objects and/or metadata associated with objects. Example objects can comprise Programs, TV Listings, Category, Tenants, Media, usage rights, and/or the like.

FIG. 10 is a flow chart illustrating another method 1000 for managing a queue. At step 1002, a first group of tasks can be selected from a queue comprising a plurality of tasks. Each task of the plurality of tasks can associated with a property, and the property associated with each task can comprises a respective value (e.g., associated with a respective task). Tasks can be associated with a variety of information indicating the requestor of the task, media objects associated with the task, type of task, agents assigned to the task, and other relevant information. As an example, a task can be associated with information fields (e.g., in a database or otherwise) such as DateAdded, OwnerID, MediaID, Method, Ready, AgentName, ScheduledTime fields described herein. As an example, the property can be an information field, such as one of the information fields described herein. The property can comprise a variety of values associated with the information field. As an illustration, an example property, the OwnerID, can comprise example values respective to each task, such as tenant A, tenant B, tenant C, and so forth or other customer identifier used to indicate a tenant of a queuing system.

At step 1004, a value associated with at least one of the tasks of the first group of tasks can be identified as an exclusion value. In one aspect, the exclusion value can be any value of the property of any task of the first group of tasks. The exclusion value can be the highest occurring value, second highest occurring value, or the like among values associated with tasks of the first group of tasks. In some implementations, multiple exclusion values can be identified. For example, some or all of the values of a property that are associated with tasks in the first group can be identified as exclusion values. In one aspect, the exclusion value can comprise at least one of an association with an account, a time attribute within a time range, a task type, an association with a media object, an association with a processing agent, and/or the like.

At step 1006, a second group of tasks not associated with the exclusion value can be selected from the queue. In one aspect, selecting from the queue the second group of tasks can comprise excluding at least one task associated with the exclusion value. For example, the second group can be selected from a pre-selected portion of the queue. The pre-selected portion of the queue can comprise only values that do not match the exclusion value. In some implementations, after step 1006 is performed, additional tasks can be added to the second group of tasks. For example a task associated with an exclusion value can be added to the second group of tasks (e.g., if other tasks not associated with exclusion value are not available to fill the second group to a certain number of tasks).

At step 1008, the second group of tasks can be processed. For example, the second group of tasks can be removed from the queue. The second group of tasks can be provided to one or more agents and/or services configured to perform, execute, or otherwise complete the tasks. In one aspect, the second group of tasks can be processed in parallel. For example, the agent and/or service can comprise and/or access one or more processors configured to process tasks in parallel. In one aspect, processing the second group of tasks can comprise accessing one or more objects and/or metadata associated with objects. Example objects can comprise Programs, TV Listings, Category, Tenants, Media, usage rights, and/or the like.

In some scenarios, one or more steps of the methods 800, 900, and 1000 can be performed iteratively to continue processing of a queue. For example, after step 810 or step 814 is performed, the method 800 can return to step 802 or other step performed by the method 800. As another example, after step 908 is performed, the method 900 can return to step 902 and the method 900 can be repeated. As a further example, after step 1008 is performed, the method 1000 can return to step 1002 or step 1004 and the method 900 can be repeated. For example, a new exclusion value can be identified based on values of tasks in the second group of tasks and the method 1000 can proceed again to step 1006 for selection of a third group of tasks not associated with the new exclusion value and/or an exclusion value from a prior iteration. In some scenarios, one or more steps of the methods 800, 900, 1000 can be skipped.

Figure 11A:
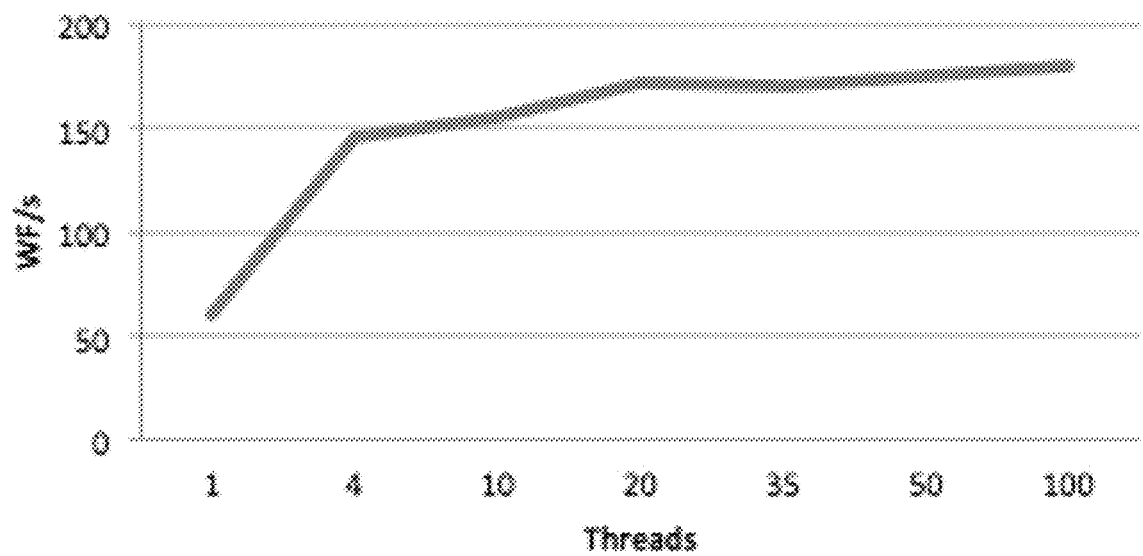
FIG. 11A is a graph illustrating performance of a queue system that selects and processes groups of tasks from a queue while maintaining minimum levels of fairness.
Figure 11B:
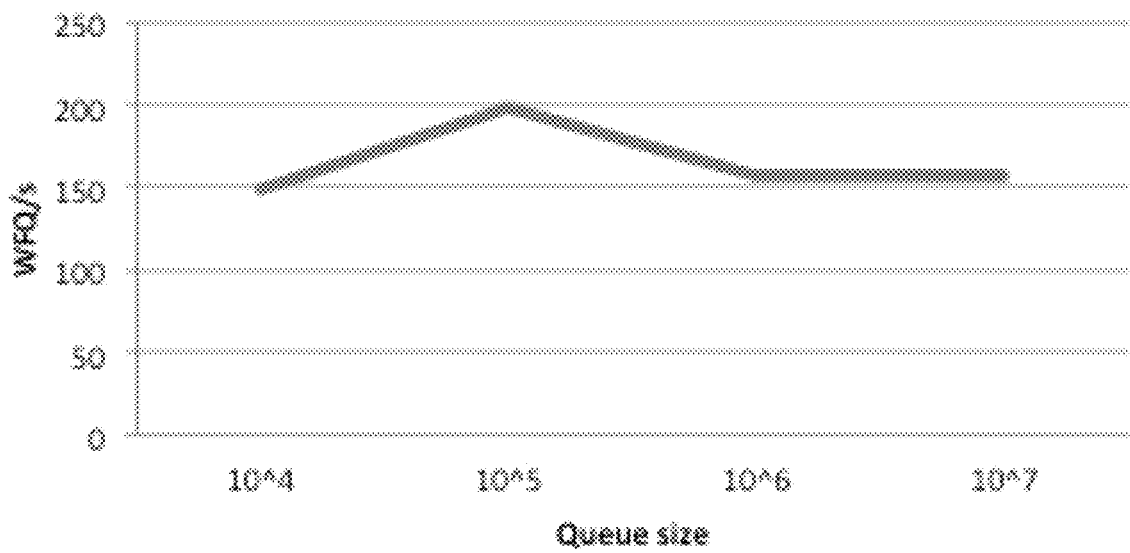
FIG. 11B is another graph illustrating performance of a queue system that selects and processes groups of tasks from a queue while maintaining minimum levels of fairness.

FIGS. 11A-11B are graphs illustrating unexpected performance achievements due to selecting and processing groups of tasks from a queue instead of just one task at a time. In implementations of the present methods in which individual tasks are selected, an example system was limited according to $O(n^x)$, where $x>1$ (exponential), runtime performance on number of threads requesting work. In such implementation, each thread in an agent would attempt to lock individual tasks, and lock contention would cause serious performance issues.

FIG. 11A is a graph illustrating performance of a queue system that selects and processes groups of tasks from a queue while maintaining minimum levels of fairness. The graph shows threads versus throughput. With the techniques of selecting and processing groups of tasks from the queue as described herein, contention due to locking of task is reduced significantly because each agent requests a batch of work as described and locking is done on the queue side in large groups. Thus, more work is handled per expensive locking action and contention is avoided per queue instance. Because of these techniques, implementations that select and process groups of tasks achieve a fairly flat throughput graph (as shown in FIG. 11A) for 100 threads or more. In contrast, implementations selecting only one task at a time are degraded above 100 threads to effectively zero throughput due to exponentially worse performance as threads grow.

FIG. 11B is another graph illustrating performance of a queue system that selects and processes groups of tasks from a queue while maintaining minimum levels of fairness. The graph shows queue size versus throughput. Implementations selecting one task at a time suffered degradation of an exponential nature as the size of the queue grew such that even a relatively small queue of objects would bring the queue to unacceptable levels of performance Using fairness algorithms that are not as strict (e.g., because fairness is achieved across groups of tasks) implementations using group task selection and processing are able to give up some absolute fairness (e.g., fairness within every group) in exchange for performance. At queue size levels where implementations selecting individual tasks failed, implementations using group selection and processing of tasks exhibited no degradation of performance. Instead, systems and methods implementing group selection and processing of tasks continued to operate without degradation of performance with queue sizes in excess of 100 times larger than implementations using single task selection. For example, single task selection implementations began to fail around 100,000 tasks, but implementations using group task selection operated on a queue of 10,000,000 tasks without failure, as shown in FIG. 11B. In sum, implementations in which groups of tasks are selected address two poorly performing constraints that occur when selecting individual tasks. Group tasks selection implementations reduce the constraints from exponentially affecting runtime to a fairly flat linear behavior.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:
1. A method, comprising:
   accessing at least a portion of a queue comprising a first plurality of tasks, wherein each task of the first plurality of tasks is associated with a property, and wherein the property associated with each task of the first plurality of tasks indicates a type of media content;

calculating a mode of distribution of the respective properties associated with each task of the first plurality of tasks;
determining, based on the mode of the distribution of the respective properties associated with each task of the first plurality of tasks, an exclusion value for the type of media content, wherein the type of media content is indicated by a second highest occurring property in the distribution;
selecting, from the first plurality of tasks, a second plurality of tasks that comprises the respective properties that do not match the exclusion value;
receiving, based on multiple requests for a group of tasks from a group of processors, a single request for the group of tasks;
determining, based on the single request and a respective originator of each task of the second plurality of tasks, the group of tasks from the second plurality of tasks;
determining, based on the respective originator of each task of the second plurality of tasks and a task dependency associated with each task of the group of tasks, a task priority of each task of the group of tasks;
sending, based on the task priority of each task of the group of tasks, to the group of processors, the group of tasks; and
executing, by the group of processors, the group of tasks in accordance with the task priority of each task of the group of tasks.

2. The method of claim 1, wherein the type of media content is indicated by the mode of the distribution and wherein the type of media content comprises at least one of: audio media content, video media content, or multimedia content.

3. The method of claim 1, wherein the exclusion value is further based on at least one of: an association with an account, a time attribute within a time range, a task type, or an association with a processor of the group of processors.

4. The method of claim 1, wherein selecting, from the first plurality of tasks, the second plurality of tasks comprises excluding at least one task associated with the exclusion value.

5. The method of claim 1, further comprising selecting, from the first plurality of tasks, at least one additional task for the second plurality of tasks after selecting the second plurality of tasks, wherein the at least one additional task is associated with the exclusion value.

6. The method of claim 1, further comprising:
determining a quantity of the tasks of the group of tasks from the second plurality of tasks for which processing is completed; and
selecting, based on the quantity of tasks of the group of tasks for which processing is completed, a third plurality of tasks from the first plurality of tasks, wherein the quantity of the tasks of the group of tasks is different than a quantity of the tasks of the third plurality of tasks.

7. The method of claim 1, wherein sending, based on the task priority of each task of the group of tasks, to the group of processors, the group of tasks comprises sending the group of tasks to the group of processors before another group of tasks is selected for processing.

8. A method, comprising:
selecting a first group of tasks from a queue of tasks, wherein each task of the first group of tasks is associated with a property;
calculating a mode of distribution of the respective properties associated with each task of the first group of tasks;
determining, based on the mode of distribution of the respective properties associated with each task of the first group of tasks, a fairness threshold;
selecting, according to a constraint, a second group of tasks from the queue, wherein the second group of tasks comprises at least one task that satisfies the fairness threshold, wherein the constraint is based on a type of media content associated with a task of the first group of tasks or the second group of tasks;
receiving, based on multiple requests for a group of tasks from a group of processors, a single request for the group of tasks;
determining, based on the single request, tasks that do not satisfy the fairness threshold, and a respective originator of each task of the tasks that do not satisfy the fairness threshold, a third group of tasks from the first group of tasks and the second group of tasks;
determining, based on the respective originator of each task of the tasks that do not satisfy the fairness threshold and a task dependency associated with each task of the third group of tasks, a task priority of each task of the third group of tasks;
sending, to the group of processors, the third group of tasks; and
executing, by the group of processors to execute the third group of tasks in accordance with the task priority of each task of the third group of tasks.

9. The method of claim 8, wherein the constraint minimizes time tasks spend in the queue according to a time-agnostic property, wherein the time-agnostic property is an order-agnostic property.

10. The method of claim 9, wherein the constraint allows uneven distribution based on the time-agnostic property within at least one of the first group of tasks and the second group of tasks.

11. The method of claim 8, further comprising distributing, based on a time-agnostic property of the tasks in the queue, processing opportunities across the first group of tasks and the second group of tasks.

12. The method of claim 11, wherein distributing, based on the time-agnostic property of the tasks in the queue, processing opportunities across the first group of tasks and the second group of tasks comprises distributing tasks associated with a first property value of the time-agnostic property to the second group of tasks before distributing tasks associated with a second property value of the time-agnostic property to the second group of tasks if a quantity of tasks associated with the second property value selected for the first group of tasks satisfies the fairness threshold.

13. The method of claim 11, wherein the time-agnostic property comprises at least one of: an association with an account, a task type, or an association with a processor of the group of processors and wherein the type of media content comprises at least one of: audio media content, video media content, or multimedia content.

14. The method of claim 8, wherein the type of media content is indicated by a second highest occurring property in the distribution.

15. A method, comprising:
accessing a queue comprising a first plurality of tasks, wherein each task of the first plurality of tasks is associated with a property, and wherein the property associated with each task of the first plurality of tasks indicates a type of media content;

calculating a mode of distribution of the respective properties associated with each task of the first plurality of tasks;

determining, based on the mode of distribution, a type of media content threshold;

selecting, from the first plurality of tasks and based on a determination that the type of media content threshold has been satisfied in at least a portion of the queue, a second plurality of tasks that are each associated with a property that indicates the type of media content;

receiving, based on multiple requests for a group of tasks from a group of processors, a single request for the group of tasks;

determining, based on the single request and a respective originator of each task of the second plurality of tasks, a second group of tasks from the second plurality of tasks;

determining, based on the respective originator of each task of the second plurality of tasks and a task dependency associated with each task of the second group of tasks, a task priority of each task of the second group of tasks;

sending, to the group of processors, the second group of tasks; and executing, by the group of processors, the second group of tasks in accordance with the task priority of each task of the second group of tasks.

16. The method of claim 15, wherein the type of media content threshold comprises a threshold value indicative of a quantity of tasks associated with the type of media content in the at least the portion of the queue.

17. The method of claim 15, wherein the determination that the type of media content threshold has been satisfied in at least the portion of the queue is based on counting a quantity of tasks associated with the type of media content.

18. The method of claim 15, wherein selecting, from the first plurality of tasks, the second plurality of tasks comprises selecting from the first plurality of tasks and the second plurality of tasks together as a bundle of tasks configured for processing by an agent.

19. The method of claim 15, wherein the type of media content comprises a media distribution package that comprises at least one of: audio media, video media, or multimedia.

20. The method of claim 15, wherein selecting, from the first plurality of tasks, the second plurality of tasks comprises excluding at least one task associated with the type of media content that satisfies the type of media content threshold.

* * * * *